Figure 1:
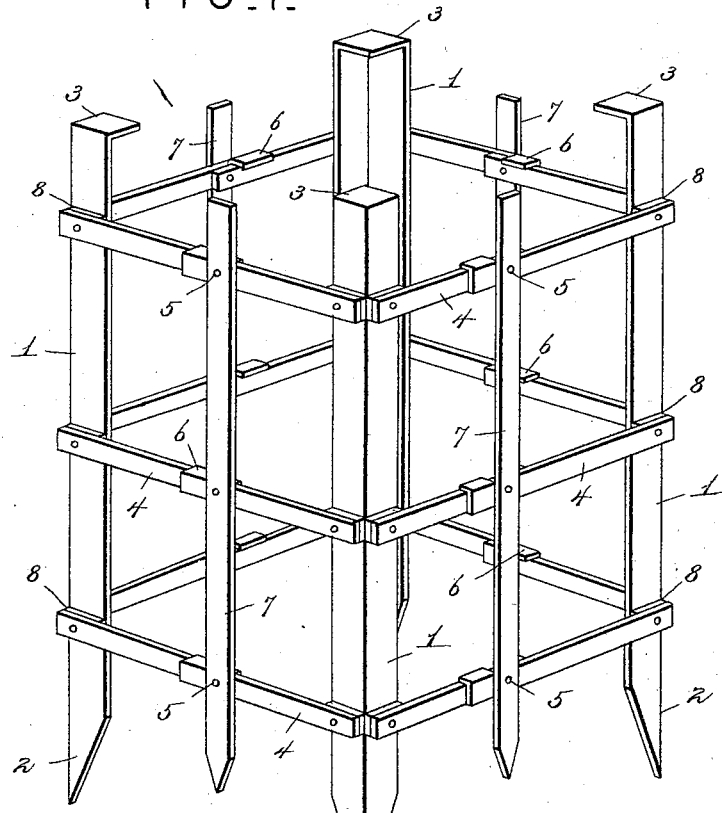

(No Model.)

H. L. ERICKSSON.
FOLDING TRELLIS.

No. 601,438. Patented Mar. 29, 1898.

Witnesses
Harry L. Amer.
Victor J. Evans

Inventor:
Harold L. Ericksson,
By John Wedderburn,
Attorney.

UNITED STATES PATENT OFFICE.

HAROLD LUDWIG ERICKSSON, OF LARCHMONT, NEW YORK.

FOLDING TRELLIS.

SPECIFICATION forming part of Letters Patent No. 601,438, dated March 29, 1898.

Application filed August 14, 1897. Serial No. 648,291. (No model.)

*To all whom it may concern:*

Be it known that I, HAROLD LUDWIG ERICKSSON, a citizen of the United States, residing at Larchmont, in the county of Westchester and State of New York, have invented certain new and useful Improvements in Folding Trellises; and I do hereby declare the following to be a full, clear, and exact description of the invention, such as will enable others skilled in the art to which it appertains to make and use the same.

This invention relates to a folding trellis, and has for its object to provide a collapsible protector especially adapted to encircle tomato-plants and plants of various kinds for the purpose of protecting the same from the elements, live stock, and farming implements when used in the cultivation of the soil adjacent to the plants.

The detailed objects and advantages of the invention will appear in the course of the subjoined description.

The invention consists in certain novel features and details of construction and arrangement of parts, as hereinafter fully described, illustrated in the drawings, and incorporated in the claims hereto appended.

Figure 2:
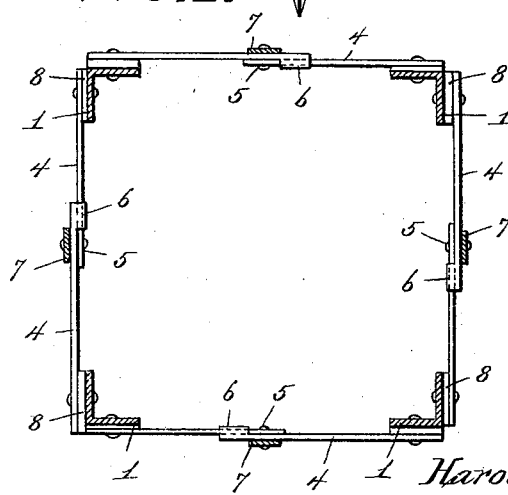

In the accompanying drawings, Figure 1 is a perspective view of the improved trellis or protector. Fig. 2 is a horizontal sectional view of the same.

Similar numerals of reference designate corresponding parts in the different views.

The improved trellis or protector contemplated in this invention comprises, essentially, four corner-posts 1, each preferably composed of angle-irons of substantially L shape in cross-section. These posts may be of any suitable height, according to the plants to be protected, and they are pointed at their lower ends, as indicated at 2, to facilitate their insertion in the soil. At their upper ends the posts are provided with rectangular caps 3, which serve to stiffen or brace the posts and which also form means for supporting sheets or netting thereon for further protecting the plants. Interposed between and connecting each pair of posts is a plurality of folding strips 4, the said strips being pivotally connected at their outer ends to the posts 1 at various intervals throughout the height of the posts and being pivotally connected at their adjacent ends, as indicated at 5. The adjacent ends of the strips 4 overlap each other, one of the strips 4 being preferably of greater length than the remaining complemental strip. The longer strip is extended beyond the pivot 5 and is provided with a laterally-extending lip 6 on its upper side, which is bent so as to extend over the top edge of the complemental strips 4, thus limiting the downward movement of the strips 4 and also of a vertical auxiliary post or strip 7, which is secured pivotally to the horizontal strips 4 at their point of pivotal connection. Interposed between the opposite ends of the strips 4 and the posts 1 are washers or spacing-pieces 8 for the purpose of enabling the device as a whole to be folded with greater ease.

In folding the trellis or protector the latter is first removed from the ground and then the strips or posts 7 are moved upward. This causes the strips 4 to fold in a similar direction, and during this movement the posts 1 are drawn toward each other until the trellis or protector assumes the folded position. It will thus be observed that the trellis or protector may be folded into very compact shape for transportation or storage. In setting up the trellis or protector the posts 1 are forced apart by pressing the strips or posts 7 downward until the lips 6 lock over the top edges of the strips 4. When the trellis or protector is thus extended, the posts 1 are driven into the ground, and, if desired, the posts or strips 7 may also be extended and pointed at their lower ends, so that they may also be driven into the ground. When the posts are thus driven into the ground, it will be impossible for the trellis or protector to collapse, as there can be no relative movement between the several corner-posts thereof, the lower ends of said posts being firmly held in the ground.

It will of course be understood that the number of posts may be increased or diminished, as desired, and that other changes in the form, proportion, and minor details of construction may be resorted to without departing from the principle or sacrificing any of the advantages of the invention.

Having thus described the invention, what is claimed as new, and desired to be secured by Letters Patent, is—

1. A folding trellis or protector, embodying corner-posts, strips connected pivotally to said corner-posts and overlapping each other intermediate said posts where they are themselves pivotally connected, and means on one of said strips whereby it is adapted to interlock with its complemental strip, substantially as and for the purpose described.

2. A folding trellis or protector, embodying corner-posts, strips arranged in pairs and pivotally connected at their outer ends to said posts and also pivotally connected at their adjacent ends, the adjacent ends of said strips being overlapped and provided with interlocking means for limiting their movement in one direction, and auxiliary strips or posts pivotally connected to the aforesaid strips at the pivotal points of connection of the latter, substantially as described.

3. A folding trellis or protector embodying corner-posts substantially L-shaped in cross-section, pointed at their lower ends and provided with rectangular caps integral with their upper ends, strips connecting said corner-posts at various intervals throughout their height and arranged in pairs, each pair of strips being pivotally connected at the outer ends to said posts and to each other at their inner ends, interlocking means at the inner adjacent ends of said posts, and auxiliary posts or strips connected pivotally to said strips at their points of connection, all arranged substantially as and for the purpose described.

In testimony whereof I have signed this specification in the presence of two subscribing witnesses.

HAROLD LUDWIG ERICKSSON.

Witnesses:
JOHN M. OLSON,
MARTIN O. JOHNSON.